UNITED STATES PATENT OFFICE.

TOZABURO SUZUKI, OF SUNAMURA, JAPAN.

PROCESS OF MAKING FOODS.

1,175,839. Specification of Letters Patent. Patented Mar. 14, 1916.

No Drawing. Application filed September 2, 1913. Serial No. 787,663.

*To all whom it may concern:*

Be it known that I, TOZABURO SUZUKI, engineer and machine manufacturer, subject of Emperor of Japan, residing at No. 401 Jibeishinden, Sunamura, Minami-Katsushika, Tokyo, Japan, have invented new and useful Improvements in Processes of Making Foods, of which the following is a specification.

This invention relates to a process of producing nutritious foods, and consists of making a thick liquid, by grinding beans, particularly the soja bean, with the addition of water, and separating the liquid after boiling into juice and lees by means of a centrifugal machine or any other suitable apparatus, then condensing the juice by evaporation, and the condensed juice is further dried in a suitable drying apparatus and powdered or made into any other desired forms.

According to this invention, to the condensed juice may be added other materials, by which water in the juice is absorbed, and then the compound dried and powdered.

This invention has for its object to produce very economically a new nutritious food, rich in albuminous substances, in forms convenient for storing and transportation.

The process of carrying out this invention into practice is given for example as follows:— Beans are first steeped in water, and when they become soft, are macerated into a milky liquid adding water while the operation is being carried on. Such milky liquid may be produced alternatively in the following way. Beans may be at first ground into fine powder, and water added to the powder while it is stirred. The milky liquid is then boiled in a suitable kettle, and the lees separated and removed therefrom by means of a centrifugal machine or any other suitable apparatus. The remaining juice is then introduced into a low pressure evaporator or vacuum evaporator, and condensed into a dough-like mass by evaporation. The dough-like mass is taken into flat trays and fully dried in any suitable apparatus, and then it is finally either powdered or molded into any desired forms.

According to this invention, this product of the above process, or other animal albuminous substances, may be added to another measure of the juice, which has been condensed after the removal of lees. Thus the water of the juice is partly absorbed by the added substances, and the juice may be more easily converted into dough-like mass, convenient for handling, than by evaporation only. Such new product is then dried and powdered or made into any desired form in the same manner as before described.

As this invention is carried out in the manner as substantially described, the produced food contains a large quantity of albuminous substances, and is not only rich in nutriment, but convenient in storing and transportation. Such product is obtained very economically and in a simple manner.

What I claim is:—

1. The process of producing food comprising forming a mash by cooking beans in water, separating liquid ingredient from the mash, condensing the separated liquid, and supplying an albuminous moisture absorbing element to the condensed liquid and evaporating moisture from the resulting product for leaving a dry solid food product.

2. The process of producing food comprising forming a mash by cooking beans in water, separating liquid ingredient from the mash, condensing the separated liquid, supplying dry solid from similar liquid to the product of condensation and evaporating moisture from said product for leaving a dry food solid.

In testimony whereof I have signed my name to this specification in the presence of two subscribing witnesses.

TOZABURO SUZUKI.

Witnesses:
S. ITO,
H. F. HAWLEY.